(12) United States Patent
Willers et al.

(10) Patent No.: US 9,010,515 B2
(45) Date of Patent: Apr. 21, 2015

(54) MANUAL LAUNDRY LOADING APPARATUS

(71) Applicant: G.A. Braun, Inc., North Syracuse, NY (US)

(72) Inventors: Diedrich D. Willers, Syracuse, NY (US); Mark William Zimmerman, Syracuse, NY (US); Joseph B. Fiacchi, II, Marcellus, NY (US); Stephen D. Wilbur, Cincinnatus, NY (US); Joseph B. Gudenburr, IV, Manlius, NY (US)

(73) Assignee: G.A. Braun, Inc., Syracuse, NY (US)

( * ) Notice: Subject to any disclaimer, the term of this patent is extended or adjusted under 35 U.S.C. 154(b) by 0 days.

(21) Appl. No.: 13/708,296

(22) Filed: Dec. 7, 2012

(65) Prior Publication Data
US 2013/0341155 A1    Dec. 26, 2013

Related U.S. Application Data

(60) Provisional application No. 61/567,796, filed on Dec. 7, 2011.

(51) Int. Cl.
*B65G 41/00*    (2006.01)
*D06F 95/00*    (2006.01)

(52) U.S. Cl.
CPC .............. *B65G 41/007* (2013.01); *D06F 95/00* (2013.01)

(58) Field of Classification Search
USPC .................................................. 198/300–312
See application file for complete search history.

(56) References Cited

U.S. PATENT DOCUMENTS

| | | | | | |
|---|---|---|---|---|---|
| 2,359,493 | A | * | 10/1944 | Schreck | 254/2 B |
| 3,123,889 | A | * | 3/1964 | Watts et al. | 28/289 |
| 3,400,467 | A | * | 9/1968 | Drace | 34/529 |
| 3,779,404 | A | * | 12/1973 | McWilliams | 414/344 |
| 3,788,452 | A | * | 1/1974 | McWilliams | 198/313 |
| 4,067,432 | A | * | 1/1978 | Powell, Sr. | 414/295 |
| 4,321,889 | A | * | 3/1982 | Michaelsen et al. | 119/846 |
| 4,856,640 | A | * | 8/1989 | Beswick et al. | 198/311 |
| 5,697,753 | A | * | 12/1997 | Aurora et al. | 414/398 |
| 7,641,040 | B2 | * | 1/2010 | Harris | 198/396 |
| 2006/0078409 | A1 | * | 4/2006 | Takeda | 414/343 |

* cited by examiner

*Primary Examiner* — William R Harp
(74) *Attorney, Agent, or Firm* — George R. McGuire; Frederick J. M. Price; Bond Schoeneck & King, PLLC

(57) ABSTRACT

A manually operated laundry load apparatus including a base unit, a conveyor assembly interconnected to the base unit and having a conveyor belt that is driven by a motor to move in an upwardly inclining direction, and a fork truck with a handle that is interconnected to the base unit to permit movement of the load chute.

12 Claims, 3 Drawing Sheets

MANUAL LAUNDRY LOADING APPARATUS

CROSS REFERENCE TO RELATED APPLICATION

The present application claims priority to U.S. Provisional Application Ser. No. 61/567,796, filed Dec. 7, 2011, the entirety of which is hereby incorporated by reference.

BACKGROUND OF THE INVENTION

The present invention relates to industrial laundry washing machines, and more particularly to manually operated chutes that assist in the loading of laundry machines.

Industrial washing machines are particularly large, heavy units in which significant loads of linens (linens being a generic term used to refer to the various sorts of items typically washed in an industrial washing machine, such as bedding, towels, uniforms, etc) are washed at one time. Due to the large size and weight of the laundry machines, loading and unloading them is an arduous task, typically assisted by means of a hydraulic assembly that pivots the laundry machines between load, wash, and unload positions. These hydraulic assemblies, in turn, must be powerful units due to the significant weight associated with the machine itself. In addition to the pivotal movement of the machines, their large size typically results in the loading/unloading door to be positioned at a height that is higher than an average person's standing reach, thus requiring workers to stand on platforms to perform the loading and unloading tasks. The platforms add an obvious additional danger to the laundering process.

It is a principal object of the present invention to provide a manually operated chute to assist in the loading of an industrial washing machine.

It is a further object of the present invention to provide a manually operated chute that may be quickly and easily moved from one washing station to another.

Other objects and advantages of the present invention will in part be obvious and in part appear hereinafter.

SUMMARY OF THE INVENTION

In accordance with the foregoing objects and advantages, the present invention provides a manually operated laundry load apparatus comprising a base unit, a conveyor assembly interconnected to the base unit and having a conveyor belt that is driven by a motor to move in an upwardly inclining direction, and a handle that is interconnected to the base unit to permit movement of the load chute. The base unit comprises a rigid frame with an open rear surface (i.e., the surface where an operator would be stationed), a pair of channels attached to the frame and extending horizontally along the bottom of the frame, and a hydraulic cylinder housing that is attached to the front surface of the frame. A hand truck with a pair of skids that are positioned to engage the channels attached to the frame is position-able within the open space defined at the rear of the frame and is adapted to hold a battery box or other power source within the volume of the frame. The battery or power source within the battery box drives the skids along a vertical axis to raise (allowing it to be moved) and lower (allow the base unit to rest on the floor and the unit to operate) the base unit in typical fork-lift type fashion.

The hydraulic cylinder housing includes at least one hydraulic cylinder that is connected to a frame. The frame is attached to the underside of the conveyor unit's rails and drives the leading edge of the conveyer along a vertical axis to increase or decrease the inclination of the conveyor as necessary to position the end of the conveyor in alignment with an opening of a washing machine.

A commercial off the shelf conveyor device is mounted atop the base unit and includes a motor driven belt on which linens may be placed for carrying them towards and dumping them into the washer. The conveyor also includes a support frame and sidewalls that prevent linens from falling off the sides of the conveyor. A chute mounted at the leading edge of the conveyor is adapted to engage the opening of the washer and guide the linens into the washer while preventing them from falling off the conveyor prior to falling into the washer.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
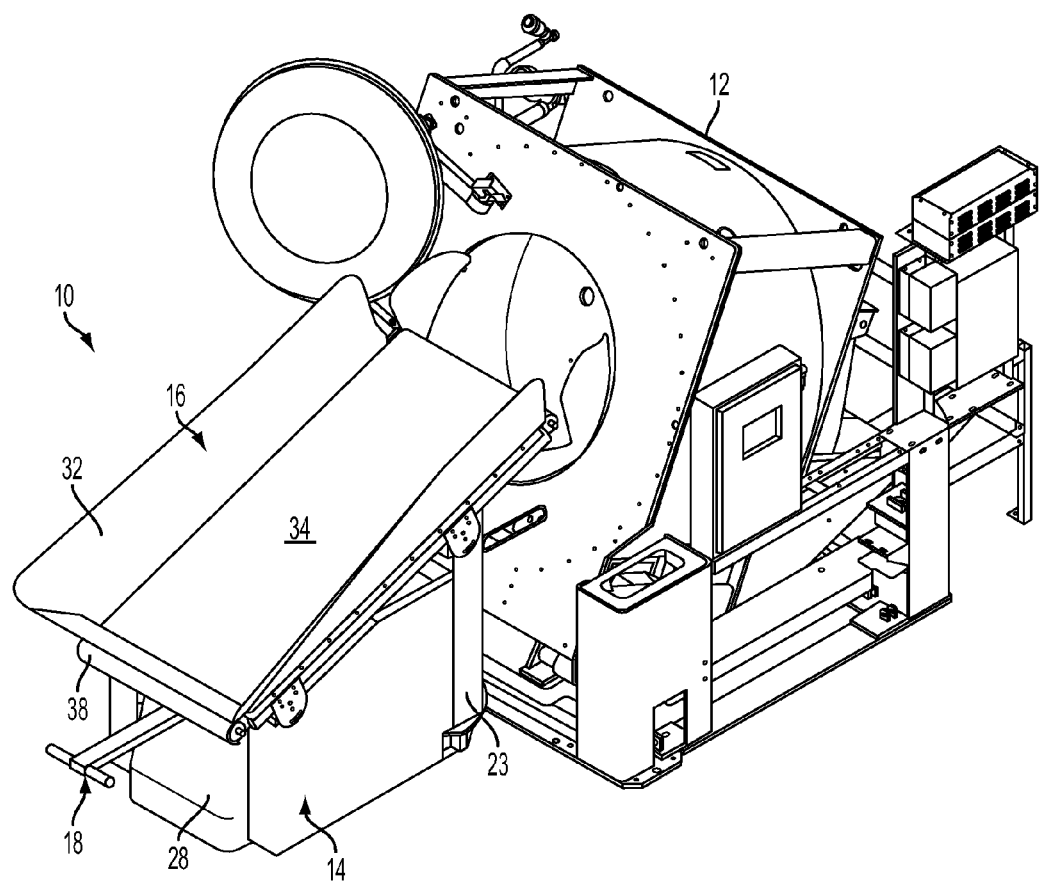
FIG. 1 is a perspective view of the present invention.
Figure 2:
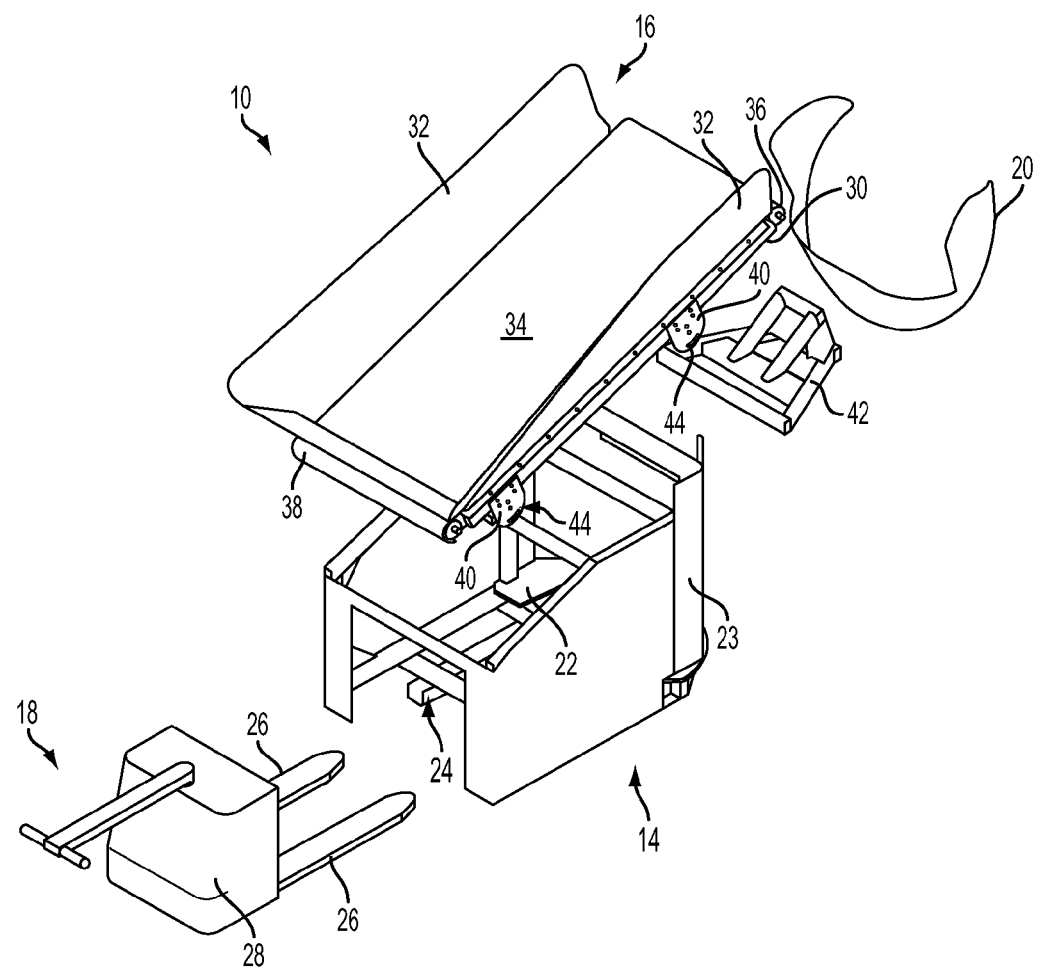
FIG. 2 is an exploded perspective view thereof.
Figure 5:
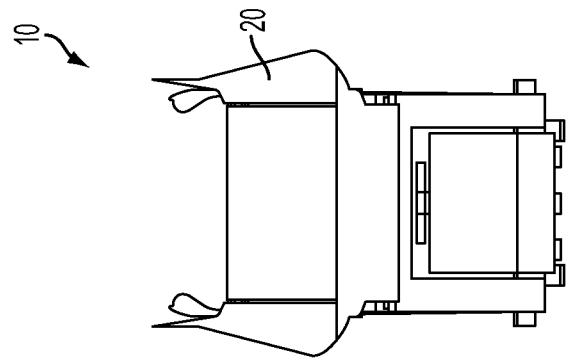
FIG. 5 is a front elevation view thereof.
Figure 4:
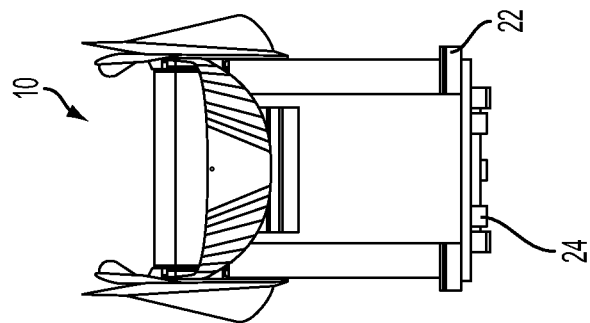
FIG. 4 is a rear elevation view thereof.
Figure 3:
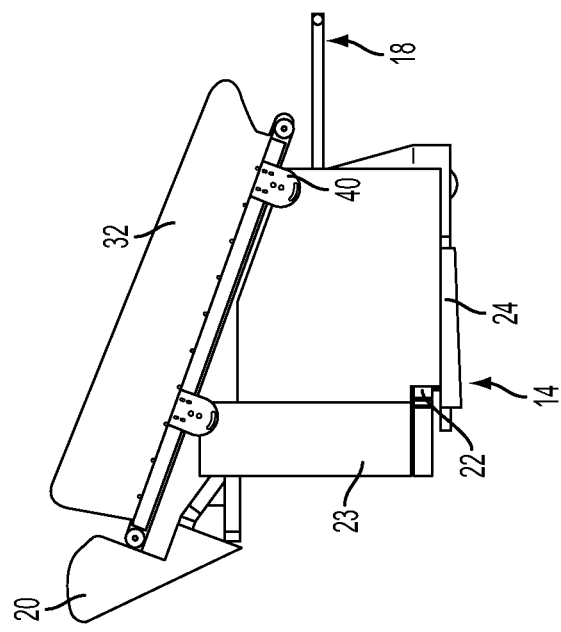
FIG. 3 is a side elevation view thereof.

Referring now to the drawings, in which like reference numerals refer to like parts throughout, there is seen in FIG. 1 a linen loading apparatus, designated generally by reference numeral 10, for assisting in the loading of linens into an industrial washing machine 12 and generally comprising a base unit 14, a conveyor unit 16 mounted atop base unit 14, and a hand truck/handled vestil assembly 18 that is movable into and out of engagement with base unit 14 to permit manual movement of loading apparatus 10. A chute 20 is attached at the leading edge of the conveyor and is adapted to successfully guide linen that rides on the conveyor into washer 12.

Base unit 14 comprises a frame 22 and a pair of channels 24 that extend along spaced, parallel, horizontal axes at floor level. The frame 22 includes an upper edge that slopes upwardly from the rear of the unit (where an operator would stand) towards the front of the unit (where linen would drop off the conveyor and into washer 12). The rear/operator station of the base unit 14 includes an opening 25 to accommodate ingress of hand truck 18. Attached to the front surface of the base unit 12 is a hydraulic cylinder housing 23 that provides the motive means for vertically moving the leading edge of the conveyor.

Hand truck 18 includes a pair of skids 26 that are adapted to engage the channels 24. A battery box 28 that rides on hand truck 18 includes a battery that provides power to drive the skids 26 in a vertical plane to raise or lower the base unit 14 relative to the ground in typical fork-lift type fashion. Wheels or casters mounted on the bottom of hand truck 18 help facilitate manual movement of apparatus 10.

Conveyor unit 16 comprises a frame with belt frame/rails 30 and opposing side rails 32, and a conveyor belt 34 driven by a drive roller 36 on one end and guided by an idler roller 38 at its opposite end. Brackets 40 interconnect conveyor unit 16 (more specifically belt frame/rails 30) to base unit 14 and to a frame 42 that moves the leading edge of conveyor unit 16 along a vertical axis to increase or decrease its angle of inclination. Frame 42 is coupled to the hydraulic cylinders mounted in housing 23. Brackets 40 include U-shaped grooves 44 formed therethrough and through which a pin connecting the conveyor to frame 42 and base unit 14 pass.

The U-shaped grooves 44 permit pivotal movement of the bracket such that conveyor unit 16 can move upwardly or downwardly.

Apparatus can be used by manually moving linen from a cart onto belt 34. Alternatively, it can also be used in a sling type laundry system where linen can be dropped from the sling onto the belt 34.

What is claimed is:

1. An assembly for assisting in the loading of a laundry machine, comprising:
    a base unit comprising a front surface;
    a conveyor unit interconnected to said base unit comprising a belt automatically movable in an upwardly inclining direction;
    a housing attached to the front surface of said base unit that stores motive means, said motive means is operable to move along a vertical axis for moving a leading edge of said conveyor unit along the vertical axis;
    a handle interconnected to said base unit;
    a frame disposed between said conveyor unit and said base unit; and
    a bracket that interconnects said conveyor unit and said frame.

2. The assembly according to claim 1, wherein said base unit comprises a base frame having a rear end and a front end, and first and second channels that extend along spaced, parallel, horizontal axes.

3. The assembly according to claim 2, wherein said base unit slopes upwardly from said rear end towards said front end.

4. The assembly according to claim 3, wherein said rear end includes an opening.

5. The assembly according to claim 4, wherein said handle is adapted to engage said first and second channels through said opening.

6. The assembly according to claim 2, wherein said housing contains equipment for providing stored therein.

7. The assembly according to claim 6, wherein said equipment for providing comprises hydraulically actuated cylinders.

8. The assembly according to claim 1, further comprising a chute positioned adjacent said conveyor.

9. The assembly according to claim 1, wherein said handle comprises a hand truck and first and second skids.

10. The assembly according to claim 9, further comprising a battery mounted to said hand truck and adapted to provide power for moving said first and second skids.

11. The assembly according to claim 1, wherein said bracket includes a U-shaped groove formed therethrough.

12. The assembly according to claim 1, wherein said motive means comprises a hydraulic cylinder.

* * * * *